(12) United States Patent
Steel (10) Patent No.: US 6,186,444 B1
(45) Date of Patent: Feb. 13, 2001

(54) SLIDING POCKET DOOR FOR AIRCRAFT USE CAPABLE OF NONDESTRUCTIVE BLOW-OUT AND EASY ACCESS

(76) Inventor: Charles F. Steel, 17202 Sandra Lee La., Huntington Beach, CA (US) 92649

( * ) Notice: Under 35 U.S.C. 154(b), the term of this patent shall be extended for 0 days.

(21) Appl. No.: 09/232,100

(22) Filed: Jan. 15, 1999

(51) Int. Cl.[7] .................................................... B64C 1/14
(52) U.S. Cl. .......................... 244/129.5; 160/118; 160/214
(58) Field of Search .............................. 244/129.4, 129.5; 49/62, 370, 410; 160/118, 205, 208, 214

(56) References Cited

U.S. PATENT DOCUMENTS

| | | | |
|---|---|---|---|
| 961,726 | * 6/1910 | Mayr | 160/88 |
| 2,565,383 | 8/1951 | Linebaugh | 49/177 |
| 2,584,874 | * 2/1952 | Haas | 160/214 |
| 3,136,538 | 6/1964 | Dimmitt et al. | 49/177 |
| 4,911,219 | * 3/1990 | Dairymple | 160/118 |

* cited by examiner

Primary Examiner—Robert P. Swiatek
(74) Attorney, Agent, or Firm—Jackson Walker LLP (57) ABSTRACT

A sliding pocket door adapted for aircraft use comprising two generally tabular door segments, each laying in a common sliding plane and each attached to a carrier frame which is mounted to an aircraft bulkhead. Each door segment is attached to its carrier frame by unique hinges that allow the door segment to rotate out of the sliding plane while simultaneously dropping along their axes of rotation. This rotation will allow a nondestructive depressurization of the doors, for example, during rapid decompression in the aircraft.

16 Claims, 12 Drawing Sheets

SLIDING POCKET DOOR FOR AIRCRAFT USE CAPABLE OF NONDESTRUCTIVE BLOW-OUT AND EASY ACCESS

FIELD OF THE INVENTION

The present invention relates to a sliding pocket door for use in the interior of a cabin class aircraft, which door is capable of nondestructive blow-out and, more particularly, a pocket door with extensible hinges that are capable of allowing the pocket door segments to drop vertically on their axes of rotation as the door segments rotate out of their sliding plane.

BACKGROUND OF THE INVENTION

Aircraft interiors, especially those of large corporate jets, are often subject to extensive modifications of their interior to fit the needs of individual corporate clients. Aircraft interior designers often prefer to use doors which slide into pockets in the bulkhead because such doors are more aesthetically pleasing and will allow greater latitude of design. These doors are called "pocket doors" and consist of two segments which slide horizontally in a common sliding plane, which sliding plane is perpendicular to the floor of the aircraft interior. When the door is in a closed position, the door segments present a uniform plane parallel to the bulkhead into which they recess (the "pockets"), thereby giving the interior designer an unbroken plane on which to create designs. When the pocket door is in an open position, the door segments are recessed into the bulkhead pockets and the passengers can pass through.

However, Federal Aviation Administration regulations require doors of an aircraft interior to be capable of withstanding nondestructive blow-out. That is, if there is sudden decompression in one portion of the aircraft interior, the aircraft door must be capable of blowing out without shattering. The purpose of such nondestructive blow-out is to avoid injury to aircraft occupants by flying debris.

Presently, aircraft utilizing pocket doors contain blow-out panels whereby sections of the door segments are releasably retained to the door segments by means of lanyards.

SUMMARY OF THE INVENTION

The pocket door of the present invention represents an inprovement over the previous blow-out doors in that it is capable of nondestructive blow-out when in a closed position by means of a unique extensible hinge. The extensible hinge allows rotation of the door segments out of their sliding plane during blow-out.

More specifically, the present invention relates to door segments that articulate about their axes of rotation during blow-out while their axes are simultaneously moving parallel to the sliding plane. This combination of rotation simultaneous with movement of their axes allows the door segments to clear the bulkhead and to clear the hinges.

It is also the purpose of this invention to allow the pocket door segments to move vertically along their axes of rotation as their axes are moving parallel to the sliding plane, the purpose of such vertical movement of the pocket door segments being to allow the door segments to clear curved headliners. Retractable footers at the base of the door segments allow the bottom portion of the door segments to retract, allowing the door to drop vertically and clear curved headliners.

It is the further purpose of this invention to provide for aircraft doors recessible into bulkhead pockets, which doors, when in a closed position, allow a clean plane to be presented to the aircraft occupants and, in particular, allow the hinges to be hidden from view.

It is a further purpose of this invention to provide in a sliding door a means to remove the entire door from the bulkhead of the aircraft without the necessity of removing the decorative partition, ceiling panels, valance, chairs, cabinets, and carpet, etc., going through the bulkhead and valance of the aircraft.

It is a further object of this invention to provide for installation of a pocket door to an aircraft interior by fasteners accessible from the aisle of the aircraft interior without removing any major elements of the interior.

BRIEF DESCRIPTION OF THE DRAWINGS

FIGS. 7A through 7C are side elevational views of the sliding pocket door of the present invention with the decorative partition removed therefrom and illustrating the support panels for mounting the door and related elements thereto through the use of the runners attached to the bulkhead, FIG. 7A without door segments and FIG. 7B with door segments, one retracted, one extended.

DETAILED DESCRIPTION OF THE PREFERRED EMBODIMENT

The following description applies to aircraft interiors regardless of whether the interior has a curved or a flat headliner, but the description is also more particularly adapted to the invention as it relates to aircraft interiors with curved headliners and the additional structure required therefor.

Figure 1:
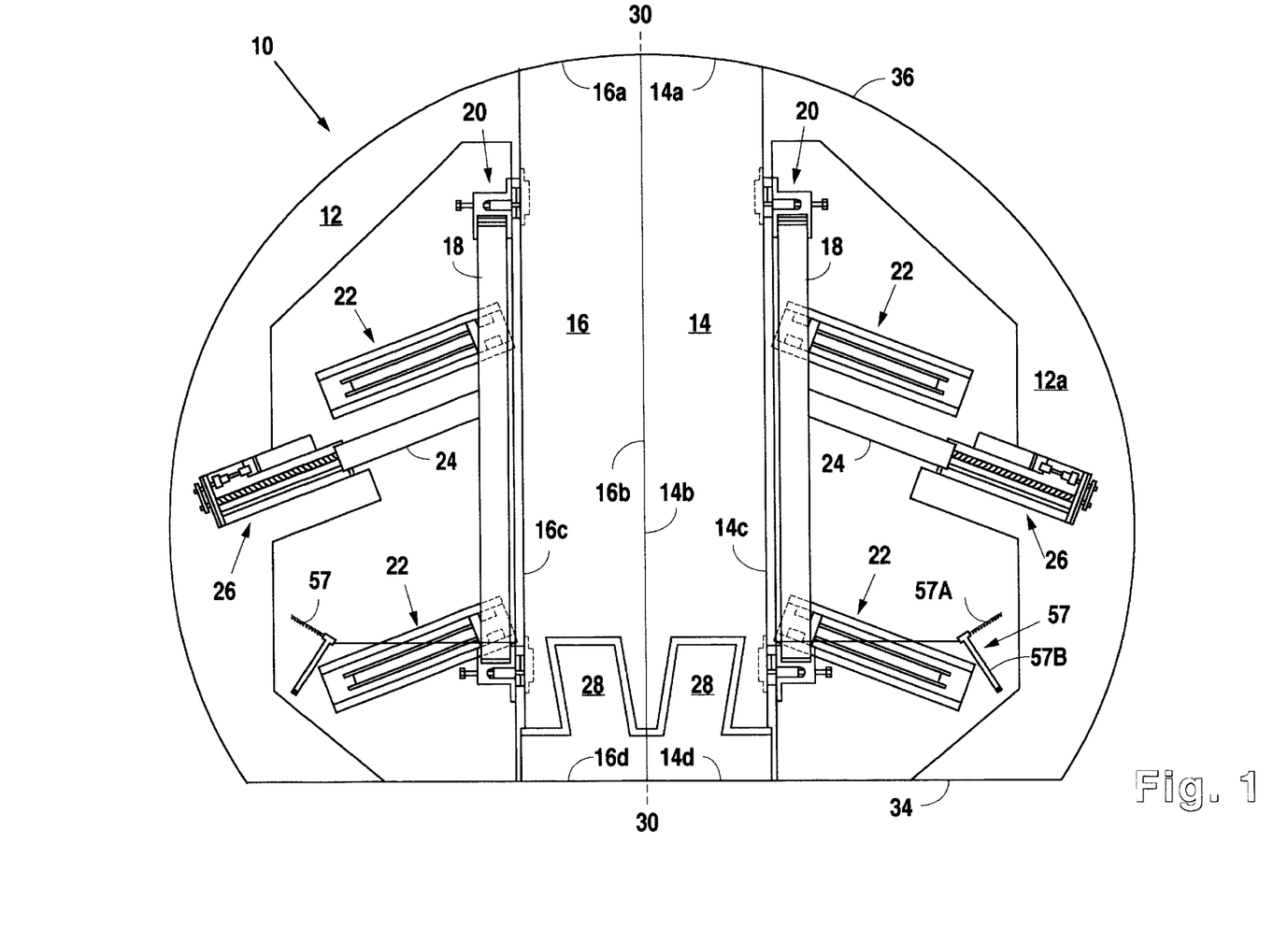
FIG. 1 is a perspective view showing the interior of the pocket door segments and the bulkhead.

FIG. 1 illustrates pocket door 10 operatively attached to aircraft bulkhead 12 inside of an aircraft, usually a cabin class twin or larger. Pocket door 10 consists of two sliding door segments 14 and 16. Door segment 14 will sometimes be referred to as the right-hand door segment and door segment 18 will sometimes be referred to as the left-hand door segment. Door segments 14 and 16 are attached to carrier means 18 by articulation means 20. Carrier means 18 is attached to track means 22 which, in turn, is located on and fixed to bulkhead 12. Drive arm 24 connects carrier means 18 to drive means 26. Footers 28 are adapted to slide retractively into door segments 14 and 16 in a manner described more fully below.

Figure 2:
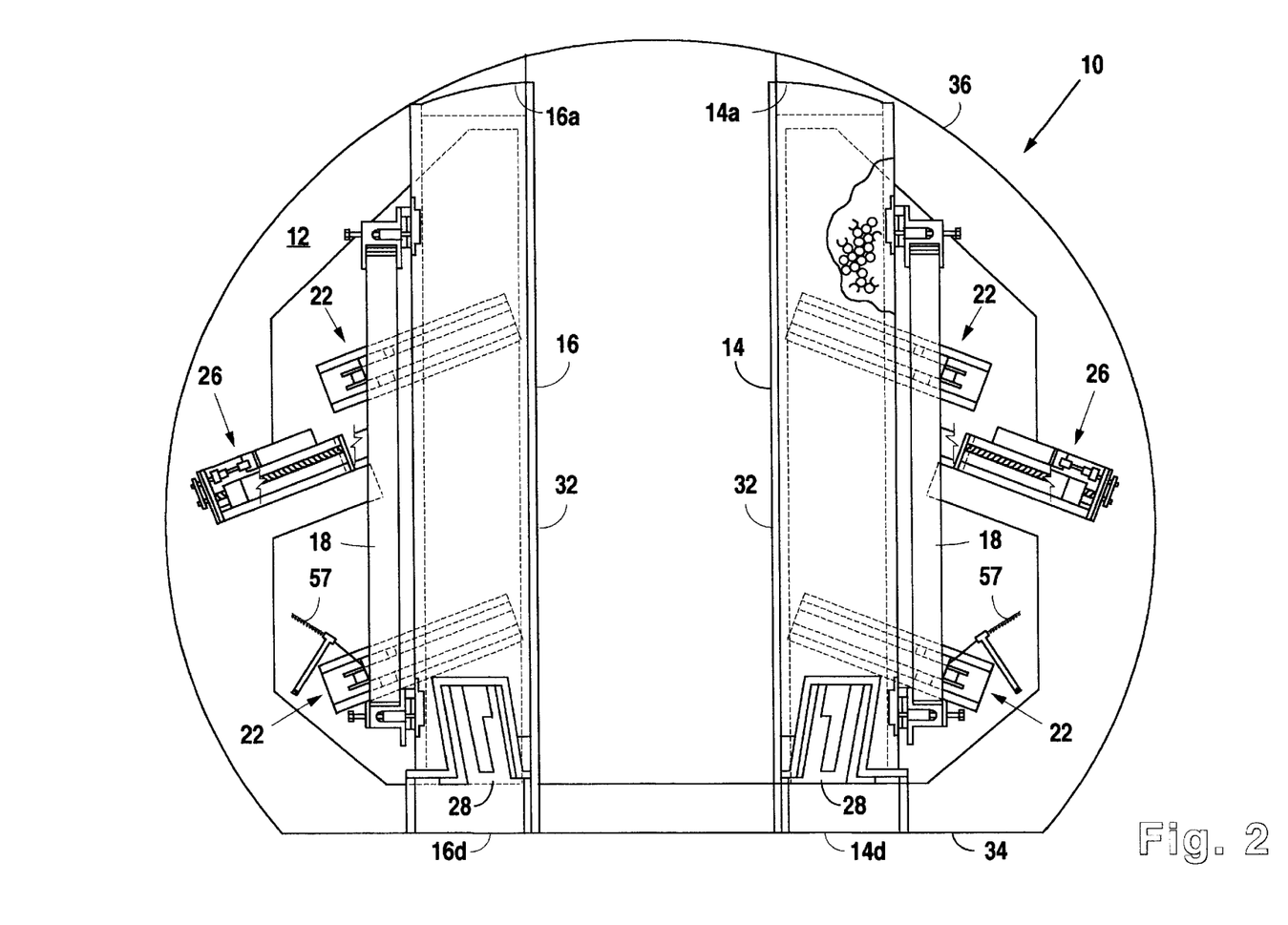
FIG. 2 is an elevation of the pocket doors in an open position also showing views of the interior of the bulkhead.
Figure 2A:
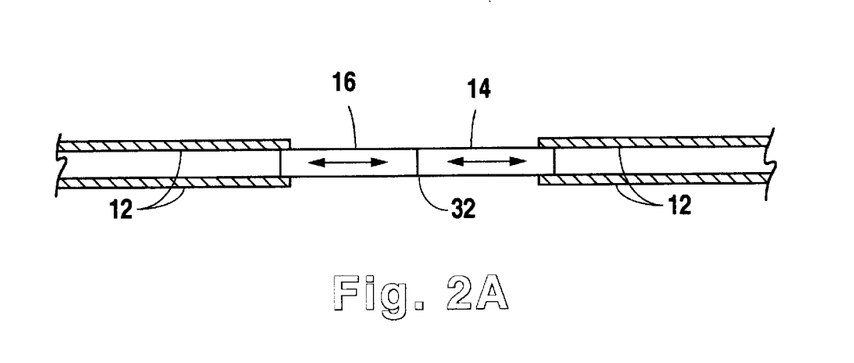
FIGS. 2A and 2b are cross-sectional elevations of the pocket door in open and closed positions and illustrating the pockets in the bulkheads.
Figure 2B:
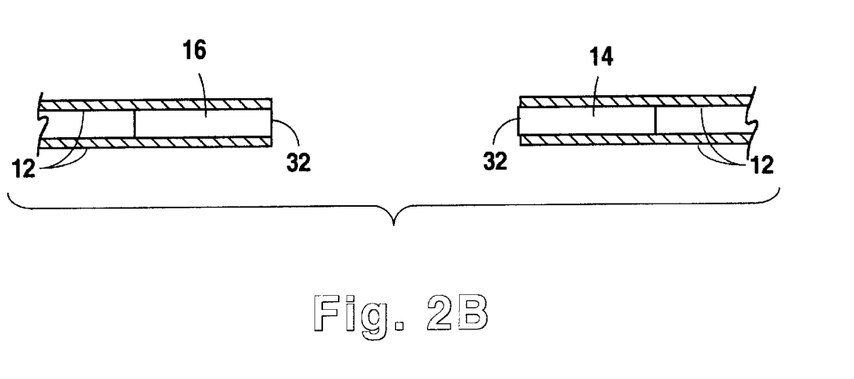

Generally, right-hand door segment 14 and left-hand door segment 16 are bilaterally symmetrical along axis 30. As can be seen in FIG. 1, door segments 14 and 16 are generally tabular with substantially similar exterior dimensions. They are sized and shaped to fit within the bulkhead pockets, as seen in FIGS. 2A and 2B. Aftnough the general outline of door segments 14 and 16 is tabular, upper edges 14A and 16A may be curved as necessary to conform to curved aircraft headliner 36. As can also be seen in FIGS. 2, 2A, and 2B, door segments 14 and 16 slide between a closed position, as illustrated in FIG. 2A, and an open position, as illustrated in FIG. 2B. It can also be seen in FIG. 2B that, when pocket door 10 is closed, articulation means 20 are hidden from view of the aircraft occupants, being recessed into the pockets of bulkhead 12. It can be seen that door segments 14 and 16 slide in the same plane, that plane being parallel to the plane of bulkhead 12. This plane will be referred to as the "sliding plane". In the closed position (FIG. 2A), side 14B of door segment 14 and side 16B of door segment 16 meet in a generally flush attitude at axis 30.

Returning to FIG. 1, it is seen that carrier 28 generally is parallel to the longitudinal axis of door segments 14 and 16 and attaches to sides 14C and 16C of door segments 14 and 16, respectively. In the preferred embodiment, articulation means 20 are located at two locations along sides 14C and 16C, respectively, in such a manner as to provide vertical support along the longitudinal axis of door segments 14 and 16.

Door segments 14 and 16 are preferably constructed of a strong, durable, lightweight material that will not warp or bend. Aluminum honeycomb is such a material and is available from Alcoa Aluminum. Along sides 14B and 16B are located pressure-sensitive strip switches 32 which will, in the electrical embodiment of the invention, d-energize drive means 26 when pressure is exerted thereon. This also acts as a safety feature to prevent one from getting trapped between door segments 14 and 16 as pocket door 10 closes. Pressure-sensitive strip switches 32 can be seen in FIGS. 2B and 6.

In operation, pocket door 10 opens and closes either manually or when a conveniently located electrical switch is activated. The switch energizes drive means 26 which is powered by the aircrafts electrical system. If pocket door 10 is in an open position, it will close when the switch is activated. If it is in a closed position, it will open. Track means 22, along which door segments 14 and 16 ride, are set at an angle to the plane of floor 34 of the aircraft interior, when headliner 36 is curved, and are set parallel to floor 34 (and perpendicular to carrier 18 when a flat headliner is used (not shown). This allows door segments 14 and 16 to rise toward curved headliner 36 as door segments 14 and 16 move from an open position to a closed position. As door segments 14 and 16 rise, biased footers 28 allow lower edges 14D and 16D to extend downwards to maintain contact with floor 34. When pocket 10 is fully closed, pressure-sensitive strip switch 32 de-energizes drive means 26 and door segments 14 and 18 are flush with bulkhead 12, floor 34, curved headliner 36, and with each other in the sliding plane. Thus, pocket door 10 meets in a substantially unbroken plane, bulkhead 12, while articulation means 20 remain hidden from view of aircraft occupants. This allows the aircraft interior designer greater latitude, having a substantially unbroken plane in which to decorate. Moreover, when pocket door 10 is in the open position, there are no headers or other structure between floor 34 and curved headliner 36.

Figure 1A:
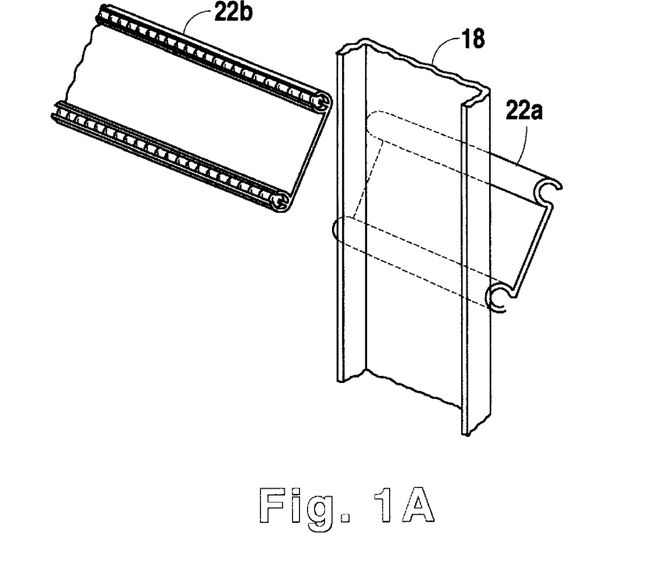
FIG. 1A is a perspective view of the carrier means and channel apparatus.

A set of two track means 22 (per door segment) are preferably located at two places along carrier means 18 so as to provide vertical support and tracking to carrier means 18 and ultimately to door segments 14 and 16. Track means 22 is more readily visible in FIG. 1A. Track means 22 consists of two parts, channel 22A and slide 22B. In the preferred embodiment, channel 22A is rigidly attached to carrier means 18. Slide 22B is rigidly mounted to bulkhead 12. Channel 22A is adapted to receive slide 22B and move freely thereon.

Figure 1B:
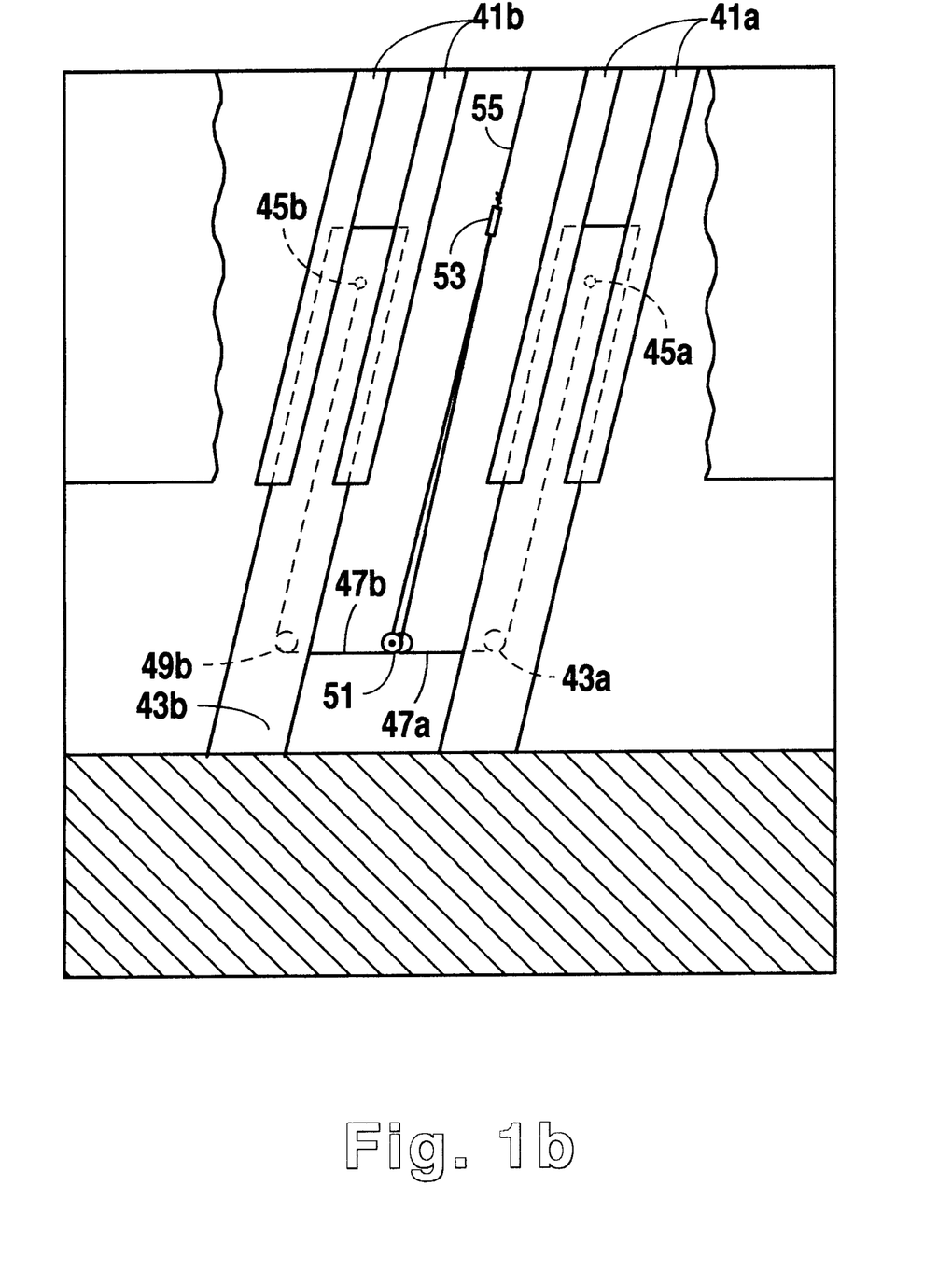
FIG. 1B is an elevational view of the footers with a cutaway of the interior mechanism thereof.

FIG. 1B illustrates the extensible footers 28. As door segments 14 and 16 open and close in normal use, they rise and fall in the sliding plane so as to fit flush with curved headliner 36 when pocket door 10 is closed. This accounts for the non-normal (non-perpendicular) angular relation between longitudinal axis 30 and track means 22. To maintain a flush relation between floor 34 and lower edges 14D and 16D, footers 28 rise into their respective door segments 14 or 16 as pocket door 10 opens, and fall as it closes. Of course, in an alternate embodiment for use with a flat headliner (not shown), door segments 14 and 16 will not rise and fall as pocket door 10 opens and closes, in which case footers 28 will not be required.

Tracks 41A and 41B enclose guide bars 43A and 43B to allow for extension and retraction of footers 28. Anchors 45A and 45B fix cables 47A and 47B to the top of guide bars 43A and 43B, respectively. Cables 47A and 47B loop around pulleys 49A, 49B and 51 and join together at 53 to form a single cable 55 which is spring 57A and pivot bar 57B loaded at 57, as seen in FIG. 1.

When sudden cabin decompression occurs or other pressure is suddenly exerted upon door segments 14 and 16 when they are in the closed position, articulation means 20 allows door segments 14 and 16 to rotate out of the sliding plane while simultaneously dropping toward floor 34. The dropping downward along the rotation axes—represented by sides 14C and 16C—occurs simultaneously with retraction of footers 28 into door segments 14 and 16. This downward movement as door segments 14 and 16 rotate out of the sliding plane allows upper edges 14A and 16A to clear curved headliner 36. If door segments 14 and 16 did not shift downward, upper edges 14A and 16A would strike and damage curved headliner 38 or pocket door 10 when door segments 14 and 16 rotated out of the sliding plane. The purpose, then, of articulation means 20 is to allow a compound motion; the rotation of one or both of door segments 14 and 16 in either direction out of the sliding plane while simultaneously allowing a shift downward along their axes of rotation. The unique design of articulation means 20, as more specifically set forth in FIGS. 3 and 4 and described below, accomplishes such a purpose.

Figure 3:
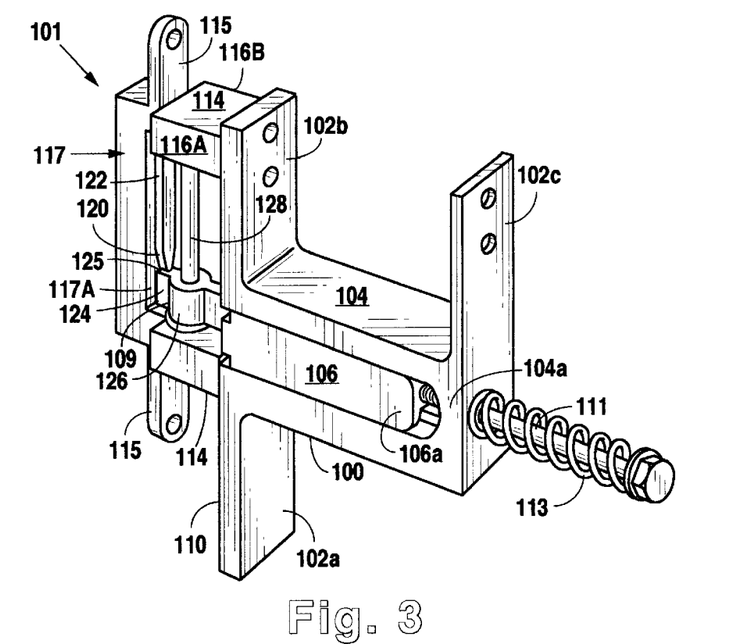
FIG. 3 is a perspective of the hinge and its normal operating position.
Figure 4:
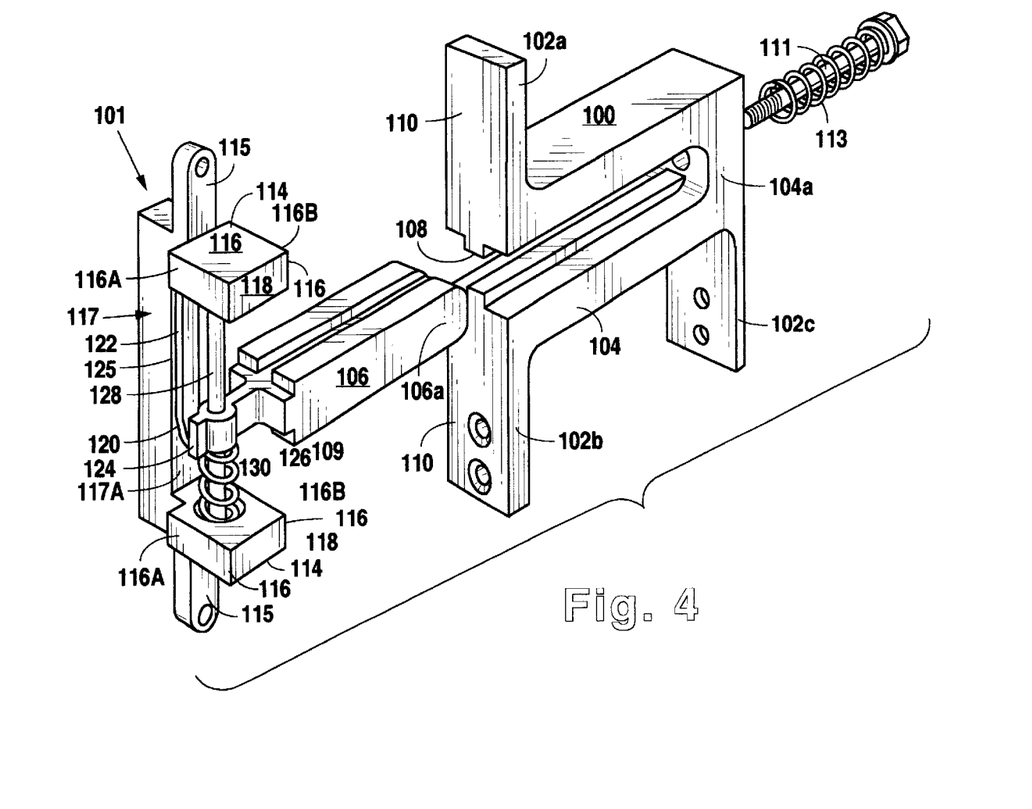
FIG. 4 is an exploded perspective of the hinge in its rotated or blow-out position.

FIGS. 3 and 4 illustrate articulation means 20. FIG. 3 illustrates articulation means 20 in normal operating or "loaded" position prior to emergency s release and rotation of door segments 14 and 18 out of the sliding plane. FIG. 4 illustrates articulation means 20 as it appears in the emergency, "unloaded", or "blow-out" position when door segments 14 and 16 lie out the sliding plane.

FIGS. 3 and 4 illustrate the two main components of articulation means 20. They are frame 100 and extensible turret 101. Frame 100 contains carrier support arms 102A, 102B, and 102C which anchor articulation means 20 by screw or other fastener means to carrier means 18. Frame 100 also comprises as a bulk center section, receiving block 104. As can be seen in FIGS. 3 and 4, receiving block 104 is shaped to confine therein sliding block 106 of turret 101 with receiving block 104 and sliding block 106 engageable in male/female relation. Sliding block 106 contains guide channel 110 therein which "mates" with guide track 108 of receiving block 104. Guide track 108 and guide channel 104 maintain proper alignment of frame 100 and turret 101 during emegency rotation of door segments 14 and 16 when they are forced to rotate out of the sliding plane. Bolt 111 is threaded into distal end of sliding block 106A and extends slideably through receiving block end 104A. It contains thereon spring 113 to bias sliding block 106 toward receiving block end 104A. As adjusting bolt 111 is threaded into the distal end of sliding block 106A, spring 113 is compressed and turret 101 is thereby forced against frame 100, the magnitude of such force being a function of the compression of spring 113. The greater the compressive force, the greater force required to rotate turret 101 off frame 100, as described in more detail below.

Turret 101 is extensible and rotatable during emergency release of door segments 14 and 18. As can be seen from FIGS. 3 and 4, turret 101 lays against bearing face 110 of frame 100. Standoff blocks 114 abut bearing face 110. Bearing face 110 is located on carrier support arms 102A and 102B lateral to the female opening of receiving block 104. Turret 101 contains door support members 115 which preferably locate and fix turret 101 to door segments 14 or 16. Thus, door segments 14 and 16 are attached to turret 101 and carrier means 18 is attached to frame 100. Frame 100 and turret 101 are operatively engaged along shaft 128, as more fully set forth below. Standoff blocks 114 have faces 16A and 116B and loaded releasing face 118 thereon. When door segments 14 and 16 are in their normal or loaded position (normal meaning in the sliding plane), releasing faces 118 of standoff blocks 114 are in flush relation to bearing surface 110 and located as illustrated in FIG. 3. When door segments 14 and 16 are in a "blow-out" or unloaded position, having rotated out of the sliding plane, turret 101 is in the position illustrated in FIG. 4, with either faces 118A or 118B flush with bearing face 110 (depending upon which way door segments 14 and 16 rotated). Releasing face 118 meets unloaded faces 116A and 116B at pivot edges 116. Standoff blocks are part of turret block 117, which makes up the backbone of turret 101.

As can be seen in FIGS. 3 and 4, turret 101 contains door support members 115 thereon. On inside face 117A of turret block 117 is located release ridge 122. Release ridge 122 is integral with face 117A and projects outward therefrom. At one end of release ridge 122 is located a tapered release shoulder 120.

At distal ends of turret block 117 are located standoff blocks 114, with shaft 128 extending therebetween. Shaft 128 is located in the sliding plane. As can be seen in FIGS. 3 and 4, shaft 128 extends through extension 109 and within extension channel 128. Release tongue 124 is part of extension 109. When pocket door 10 is in the normal position, release shoulder 120 perches atop release tongue 124, as seen in FIG. 3. Extension channel 126 acts as a bearing surface along which shaft 128 may slide during emergency blow-out of pocket door 10. Bias means 130 will bias door segments 14 and 16 downward when such blow-out occurs.

Articulation means 20, when pocket door 10 is in a normal position and operating normally between an open and closed position, serves only one purpose. That is simply to mount door segments 14 and 16 to carrier means 18. In fact, if this were the only function of articulation means 20, there would be no need for them to "articulate". However, if there were a sudden decompression in the aircraft, or a force were exerted normal (perpendicular) to door segments 14 and 16 while they are in the closed position, articulation means 20 would allow door segments 14 and 16 to rotate out of the sliding plane and shift downward on their axes of rotation.

The rotation occurs in the following manner. FIG. 3 illustrates articulation means when the door is in the normal position. A decompressive or perpendicular force is exerted on door segment 14 and/or 16, which causes turret block 117 to rotate. As rotation commences, releasing face 118 will move out of flush relation with bearing face 110 (as shown in FIG. 3) and begin to pivot on bearing face 110 along pivot edges 116. At the same time, the flat top of release shoulder 120 will be rotating across support face 125 of release tongue 124. After about 5°–20° of rotation, release shoulder 120 will fall away from support face 125, allowing shaft 128 to slide through extension channel 126 and door segment 14 or 16 to drop toward floor 34 of the plane. The dropping of door segments occurs due to gravity and under the urging of bias means 130. As rotation begins, sliding block 106 begins to slide out of receiving block 104 (an inboard) towards the longitudinal axis of the fuse along guide track 108. This maintains their axes of rotation flush with the sliding plane as door segments 14 and 16 rotate out of the sliding plane and shift downward in response to forces perpendicular to the sliding plane.

Those aircraft with flat headliners will not require door segments 14 and 16 to drop along their respective axes of rotation as they blow-out because there is no curved headliner to "clear". In such aircraft, articulation means 20, as described, need only be modified by placement of a spacer sleeve or collar over shaft 128 between upper standoff block 118 (as seen in FIG. 3) and support face 125. In the alternative, articulation means 20 could be manufactured with release shoulder 120 shaped as an inverted "T" and, thus, prevent the dropping along the rotation axes.

Figure 5:
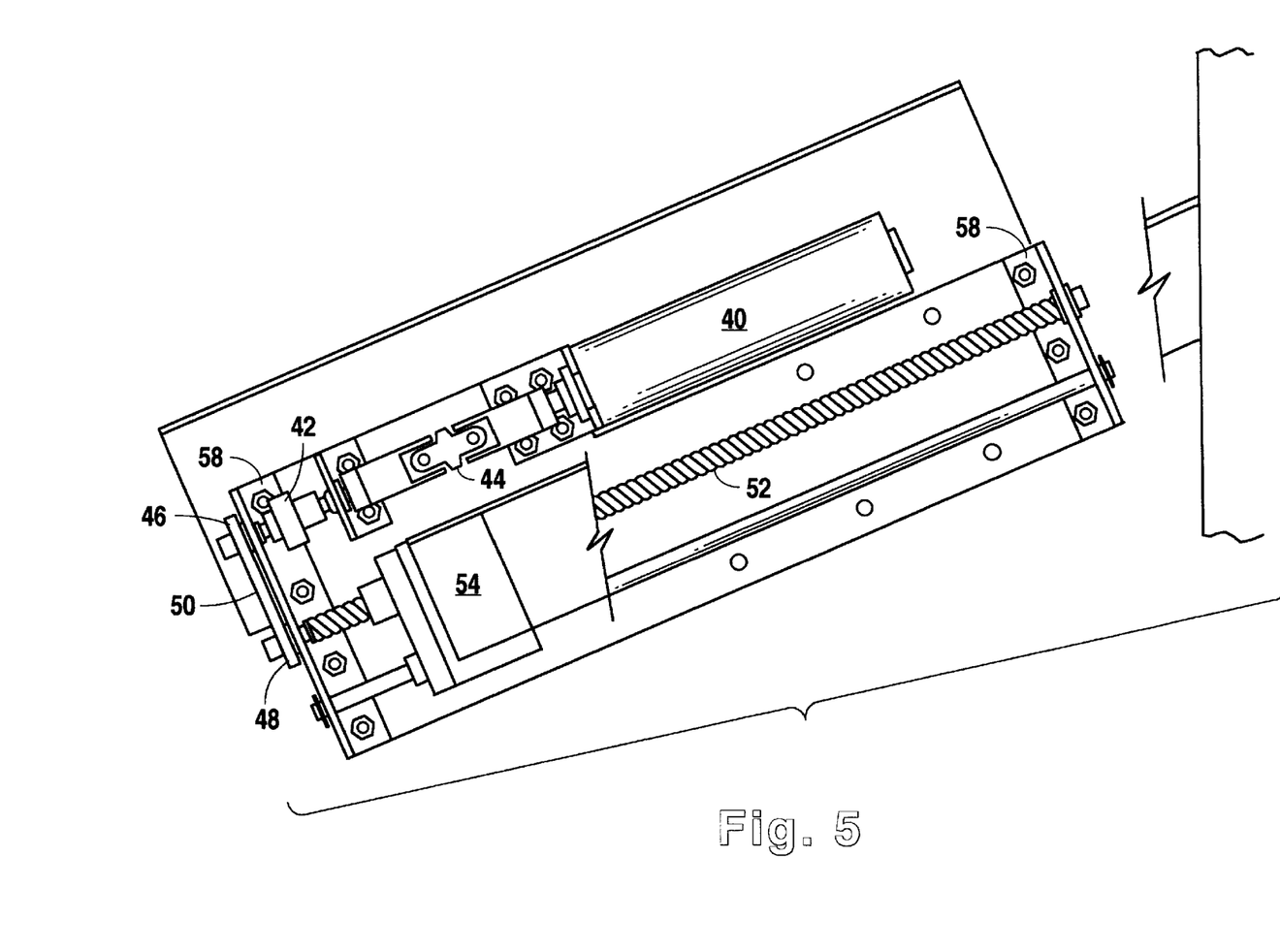
FIG. 5 is a cross-sectional elevation of the interior of the motor and drive mechanism of the pocket door.

FIG. 5 shows the detail of drive means 26. There are two drive means, each one operating door segment 14 or 16. Motor and gear head 40 are preferably electrical and are available through Micro-Mo, 742 2nd Avenue, St. Petersburg, Fla. 33701. They operate off the electrical systems of the aircraft, as more fully set forth below. Motor and gear head 40 are operatively coupled to friction clutch 42 through universal coupling 44. Drive end of friction clutch 42 turns primary toothed pulley 46 which, in turn, drives secondary toothed pulley 48 through belt means. Secondary toothed pulley 48 turns lead screw 52. Attached means 54 rides longitudinally along lead screw 52 and guide bar 56, and thus is connected to drive arm 24 for opening and closing pocket door 10. Appropriate mounting brackets 58 locate and secure components, as shown in FIG. 5.

Figure 6:
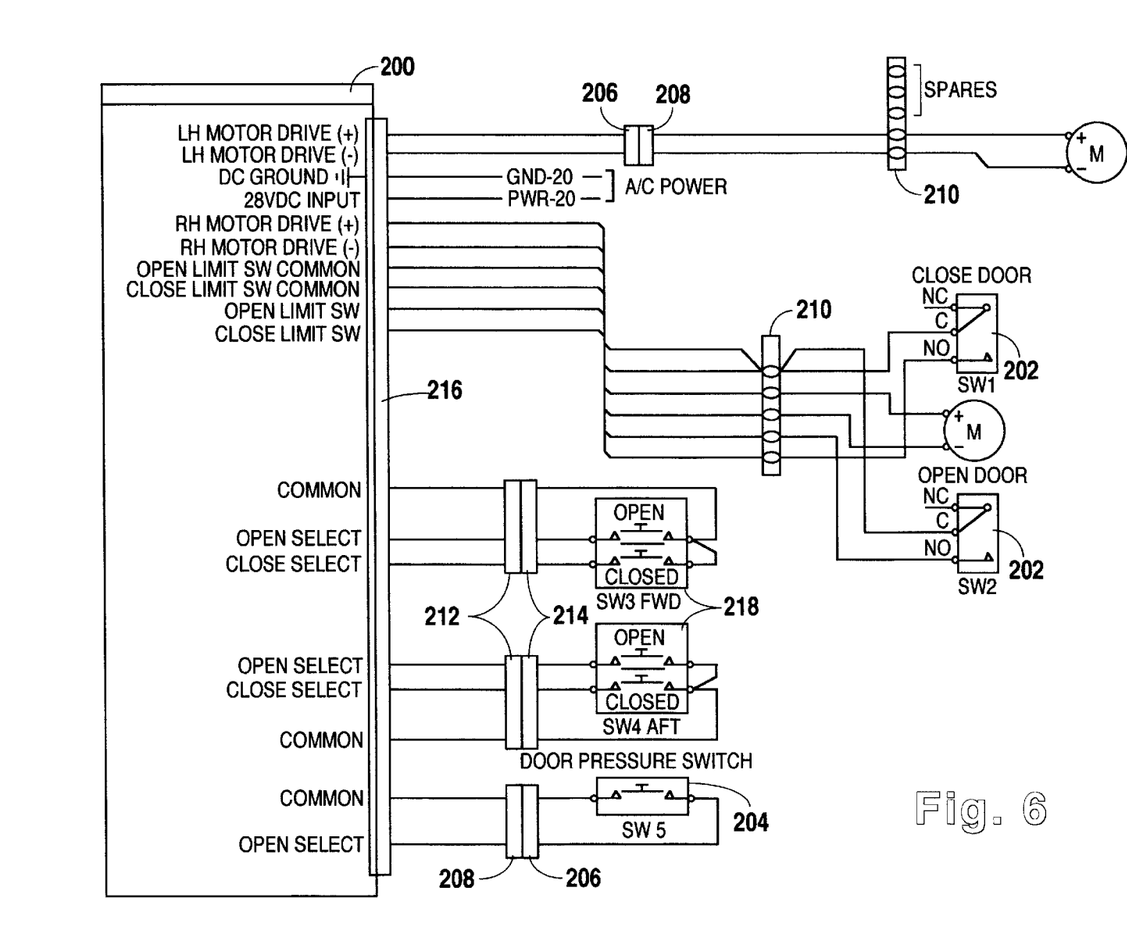
FIG. 6 is the schematic for the electric drive circuitry of the pocket door.

FIG. 6 shows electrical circuitry of the pocket door. The components are listed below in Table I. They are all available from Seecon Enterprises, Inc. 17202 Sandra Lee Lane, Huntington Beach, Calif. 92649.

TABLE I

| Number | Quantity | Description |
| --- | --- | --- |
| 200' | 1 | Controller |
| 202 | 2 | Limit switch |
| 204 | 1 | Door pressure switch |
| 206 | 2 | Socket housing |
| 208' | 2 | Pin housing |
| 210' | 2 | Thermal strip |
| 212 | 2 | Plug (socket) |
| 214 | 2 | Plug (pin) |
| 216 | 1 | Plug |
| 218 | 2 | Switch plate (micro-touch) |

All wire is AWG20. All wiring should comply with MiL-Spec 22759 and all electrical components should be installed per FAR 4313, Chapter 11, Section 7. Spiral wraps (not shown) are used as required. All circuitry and components, including controller 200', is commercially available from Steecon Enterprises, Inc. The circuit design allows a manual override in case of circuit failure.

The present invention provides for a unique method of mounting pocket door 10 onto bulkhead 12A and 12B or other elements of the interior of the aircraft. In the previous embodiment, the unit's separate elements (tracks, doors, motors) were attached to ¼" honeycomb support material which was then attached to the bulkhead through the use of threaded inserts at, typically, 12 points. These were aluminum cups with holes in the middle that were bonded into the ¼' honeycomb support material and, with a dozen 10/32" bolts about ½" long and large washers, the honeycomb support material was affixed to the aluminum bulkhead member. After that, the bulkhead is covered with a decorative partition on each side of the door. This creates a problem in providing access to the pocket door and its parts for adjustment, maintenance, troubleshooting, etc. This means one would have to go through or remove the decorative partition, ceiling panels, chairs, carpets, and maybe cabinets, to undo the fasteners attaching the bulkhead to the support panels.

As set forth in FIGS. 7A–7D, 8A–8C, and 9A–9C and the following specifications, the new structure and method of the present invention provide for the direct attachment to the bulkheads 12A and 12B of a set of, preferably four (per side) hard plastic, L-shaped runners 199 (see FIG. 7D) positioned to intercept the top and bottom edges of the ¼" honeycomb support panel 200 (to which the door, motor, tracks, and other elements are mounted) at the top and bottom edges of the panel to position and help hold the support panels to the bulkhead. The new device and method of the present invention allow for the pocket doors to slide into place on the runners and then, after the "sliding" support panel is slid into place, be screwed into the bulkhead with screws mounted adjacent the door opening and accessible therefrom. It can be appreciated that these screws, when removed, will allow the pocket door support panel, elements, motors, etc., thereon to slide out.

Turning now to FIGS. 7A–7D, 8A–8C, and 9A–9C, it is noted that each bulkhead, 12A and 12B, typically aluminum, has mounted on the runners thereto a support panel 200 and 201, each of which is made up of a door support portion 200A and 201A, and preferably a motor mount support portion 200B and 201B (both of these support portions typically being rectangular with straight sides). These support panels carry thereon the door segments, tracks, motors, and other elements of the pocket door. While two pocket door segments are illustrated instead of one, one support panels may be used with one door segment covering the entire door opening.

Figure 7A:
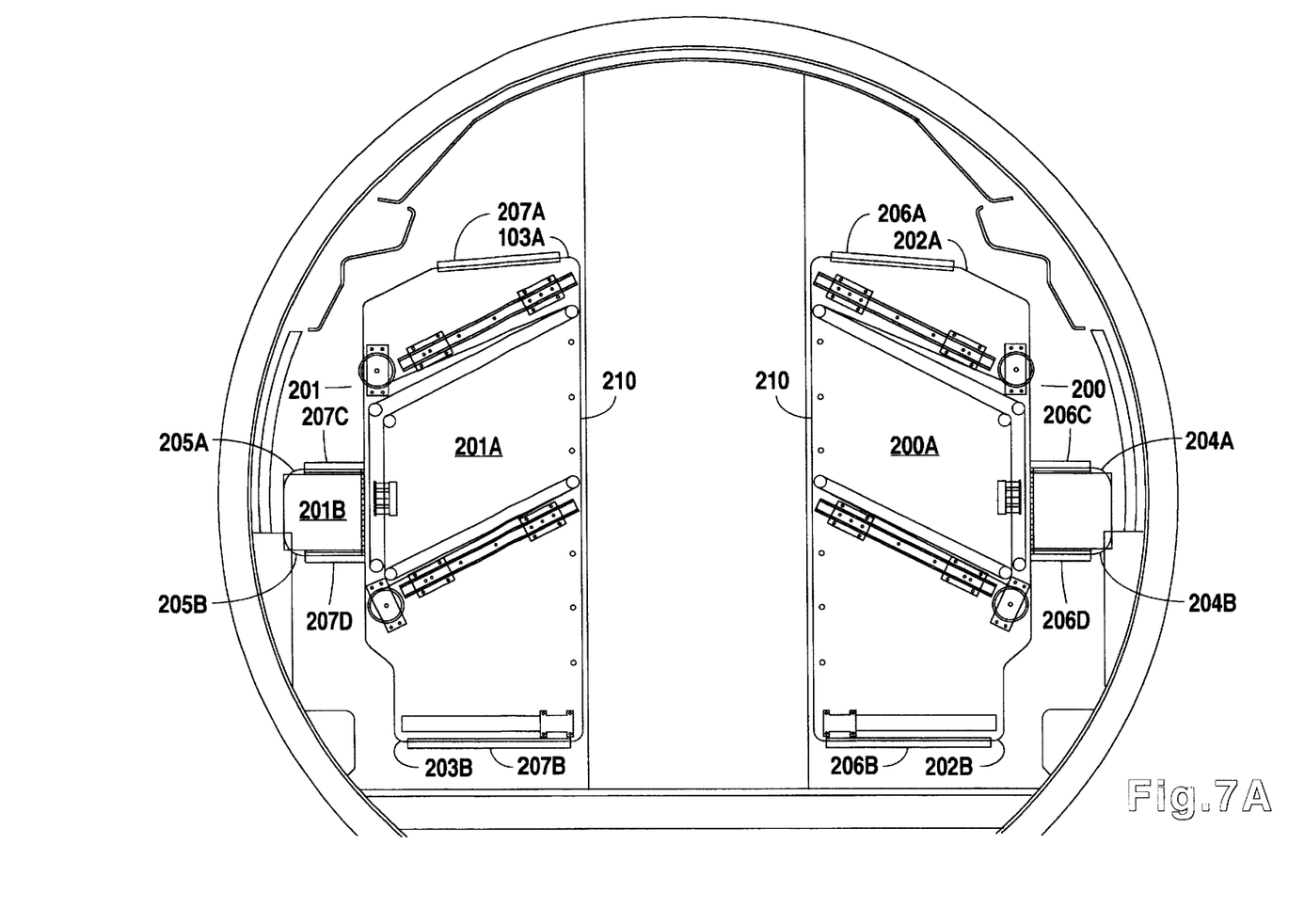

Now it can be seen with reference to FIG. 7A that there is a top front edge 202A of door support portion 200A and there is a bottom front edge 202B of door support portion 200A. There is also a top rear edge 204A of motor support portion 200B and a bottom rear edge 204B of motor mount support portion 200B (when the motor powered door is used). Runners 206A (adjacent edge 202A), 206B (adjacent edge2O2B), 206C (adjacent edge 204A) and 208D (adjacent edge 204B) hold the support panel 200 in slideable relation to the bulkhead.

Figure 7B:
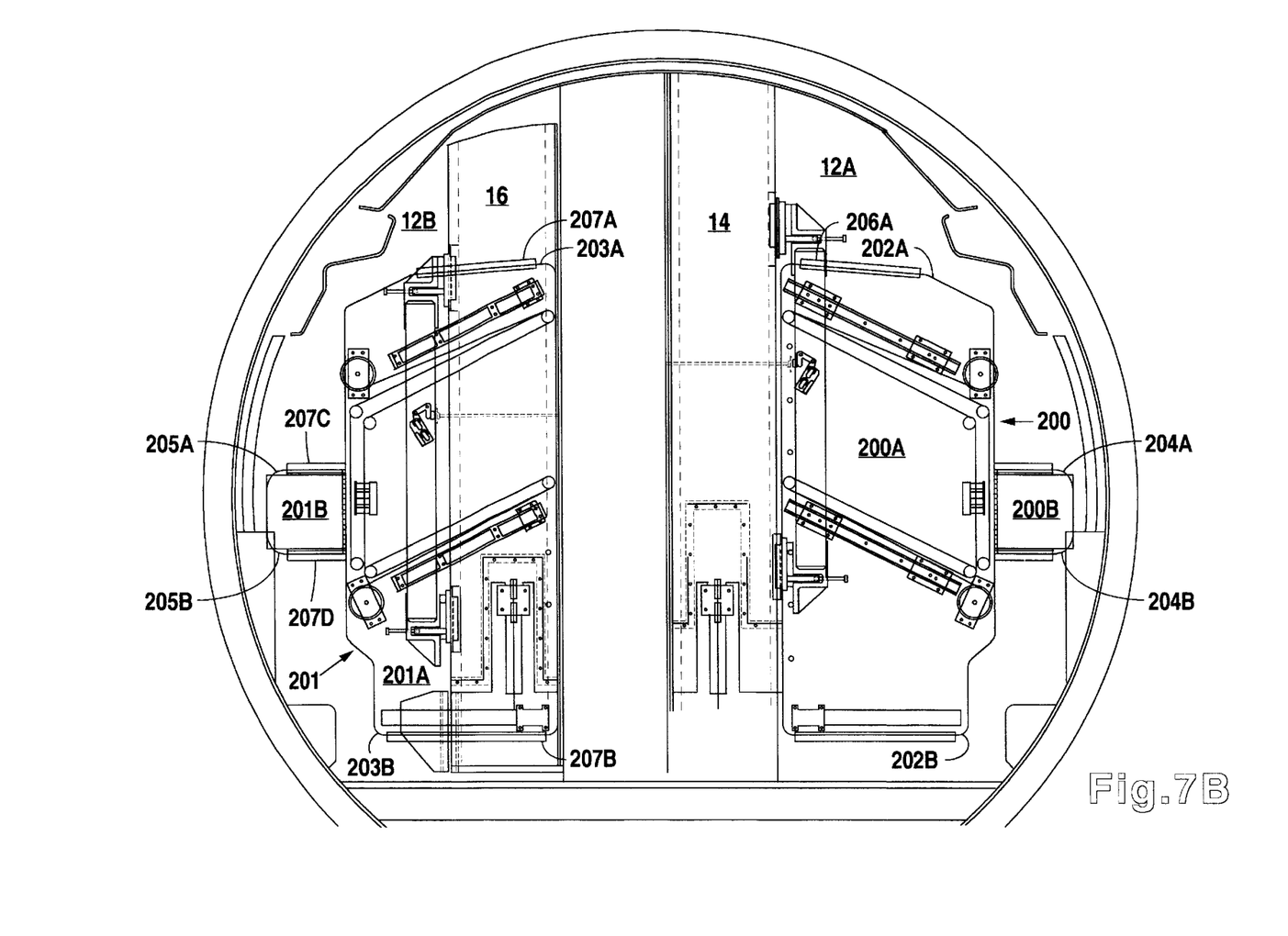
Figure 7C:
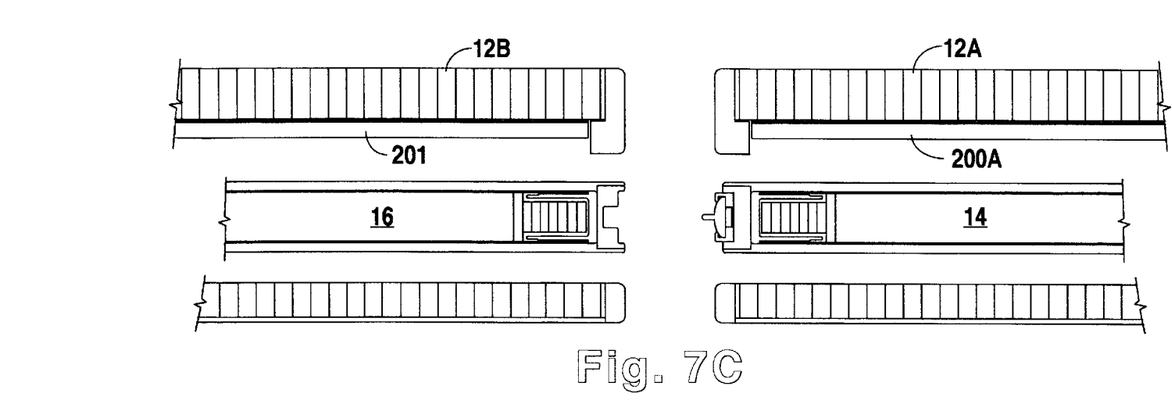
FIG. 7C is a top elevational view cutaway illustrating the support panel as it engages the aircraft bulkhead.

If a dual pocket door assembly is being used, it may be seen in FIGS. 7A–7B that runner 207A is used adjacent the front edge 203A and runner 207B is located adjacent the bottom front edge 203B. Likewise, edges 205A and 205B are enclosed by runners 207C and 207D (when the motor mount panel is used).

It is noted with reference to FIG. 7A–7B that the runners engaging the top edge of the support panels may be canted at a slight angle, opening up inboard. It is further seen that the two lower runners for engaging the front lower edge of the support panels are parallel to the floor of the aircraft. This allows installing of the pocket door assembly by placing the support panel in the channel created by the runner and the bulkhead with the lower front edge of the support panels resting on the lower runners. The support panel, with the mounting means and the door segments thereon will slide into the pocket and, when the entire unit is partway in, the canted top edges of the support panel will pick up the channel created by the top runner. The angles of the top runners are created such that there is a snug fit when the inboard edges of the support panels are adjacent the inboard edges of the bulkhead. This is a way of indexing the proper position of the support panel adjacent the inboard edge of the bulkhead. In an alternate preferred embodiment, the top and bottom runner(s) may be parallel and the top and bottom edges of the support edges may be parallel.

Figure 7D:
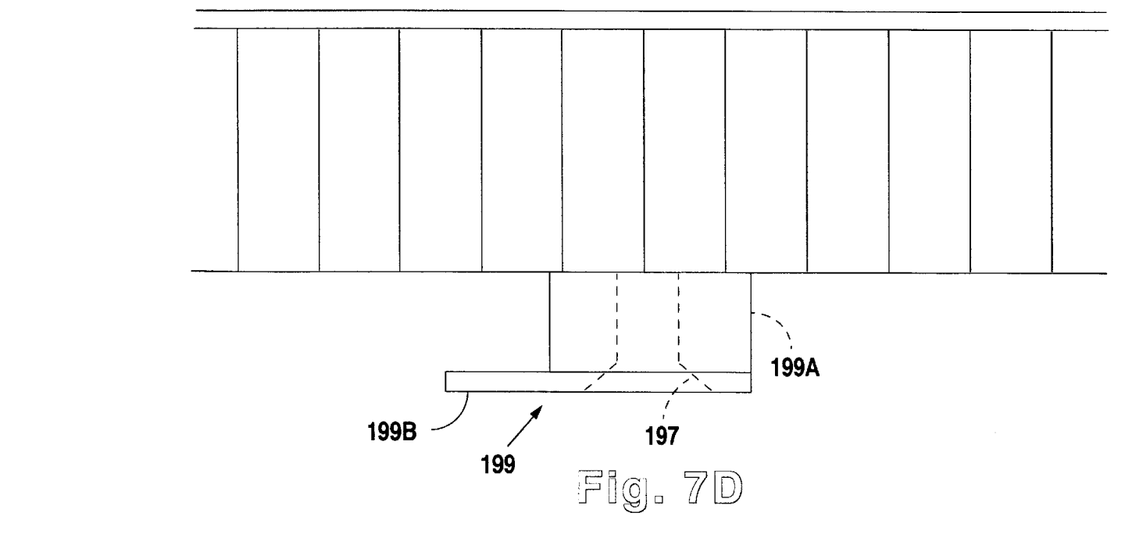
FIGS. 7D and 7E illustrate elevational views of a preferred and alternate preferred embodiment of a runner of applicant's invention.
Figure 7E:
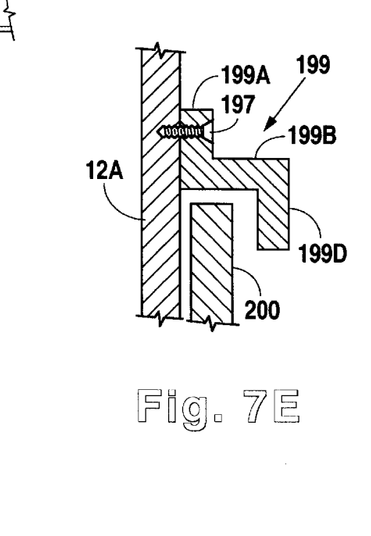

What has been accomplished with the present invention, and can be appreciated especially with reference to FIGS. 7A–7D, is the attachment of a set of L-shaped brackets or runners (generally designated) 199, each of the brackets or runners with one leg 199A affixed to bulkhead with fastener 197 and a second projected perpendicularly therefrom to "trap " the support panels 199B (see FIG. 7D and 7E). The embodiment illustrated in FIG. 7E is an alternate embodiment having Z-shaped runners with third leg 197C. Moreover, the runners are strategically placed to intercept the top and bottom edges of support panels 200 and 201 and to position them snugly to prevent vertical motion up or down and to help position the support panels laterally (side to side) so that the edge of the support panel-mounted door segment(s) is parallel to the edge of the bulkhead (when the door segment is in the retracted position). This can be seen with reference to a set of four such runners (here, runner 206A, runner 206B, runner 206C, and runner 206D). It can be seen that, when the runners 206A, 206B, 206C, and 206D are fastened onto bulkhead 12A such that the support panel, when inserted, will be positioned properly, will be held in proper vertical alignment and the inboard edges of the two rear runners 206C and 206D will act as a "stop" against further outboard movement of the panel to help properly position the leading edge of the door with the vertical inboard edge of bulkhead 12A.

Moreover, it is seen that fasteners 210, such as 10/32" bolts or screws, can be utilized to then hold and fasten support panels 200 and/or 201 to bulkhead 12A and/or 12B. Further, when fasteners are aligned vertically adjacent the inboard edge of the bulkhead and support panel, which are properly aligned by positioning them with and against the runners 199, easy access to the fasteners can be had through the space between the structural bulkhead support panel unit on the one side and the decorative partition on the other (see FIGS. 8A–8C). Further, and with reference to FIGS. 8A–8C, after the fastener is attached, a vertical decorative trim 208 may be applied to the inboard edge of the combined bulkhead support panel 200 unit. Decorative trim has a lip 208A which provides some overlap to hide the fasteners but still leaves room and sufficient access for a hand and a tool therethrough when the support panel and door elements require removal.

Figure 8A:
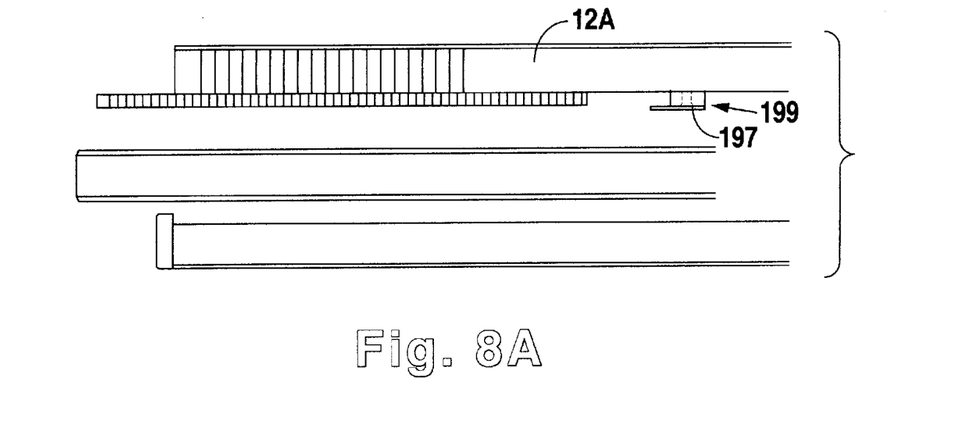
FIGS. 8A–8C illustrate in top elevational views the steps and elements provided for in mounting the door panel to the support panel with the use of fasteners aligned along the inboard edges of the combined support panel bulkhead with the decorative edge trim attached along the inboard edge thereof.
Figure 8B:
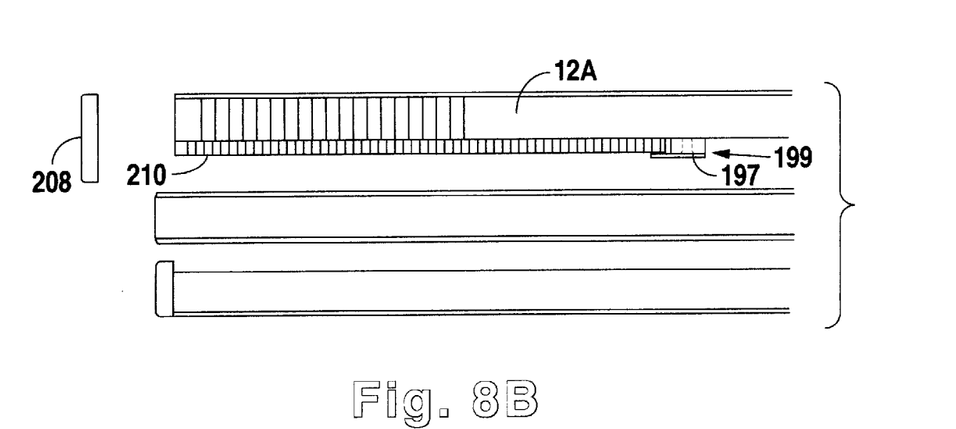
Figure 8C:
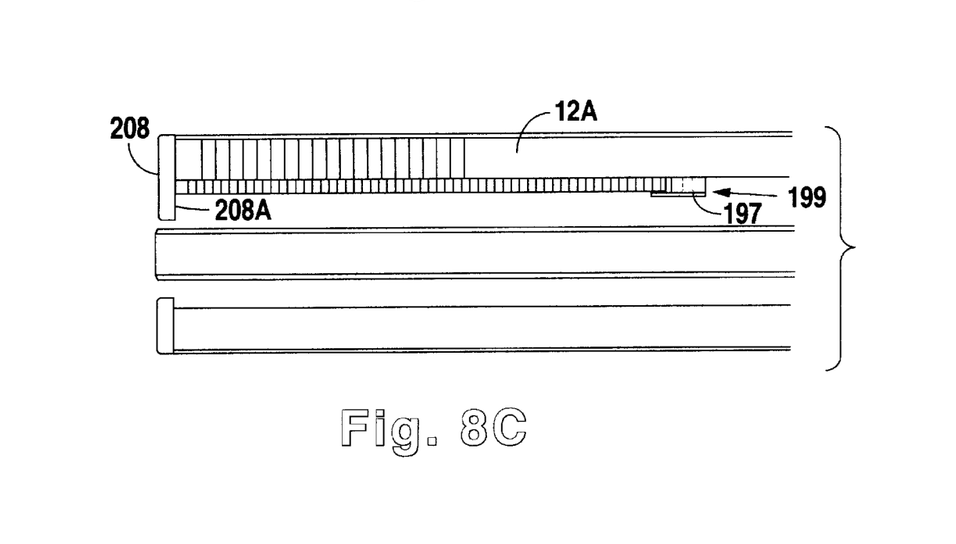

FIGS. 8A–8C illustrate the steps taken to attach the support panel to the bulk head (when a motor is used with the door). In FIG. 8A, it is seen that a support panel, with a door and other elements thereon, is slid along the top and bottom runners (not shown) until it hits stop against runner 199, which is attached to the bulk head through the use of a suitable fastener 197. In FIG. 8B, the support panel is seen to be in a proper position, adjacent to the end board edge of the bulk head, for fasteners 210 to be placed that will, in conjunction with the runners, hold the support panel in place. Yet, it is seen that the placement of fasteners 210 are adjacent the in board He of the bulk head so they are easily accessible to a mechanic who may have to work on the door or remove the door. In FIG. 8C, it is seen that the attachment of decorative trim 208 helps cover up the mechanical elements attached to the support panel, and also the fasteners along the in board edge of the support panel.

Figure 9A:
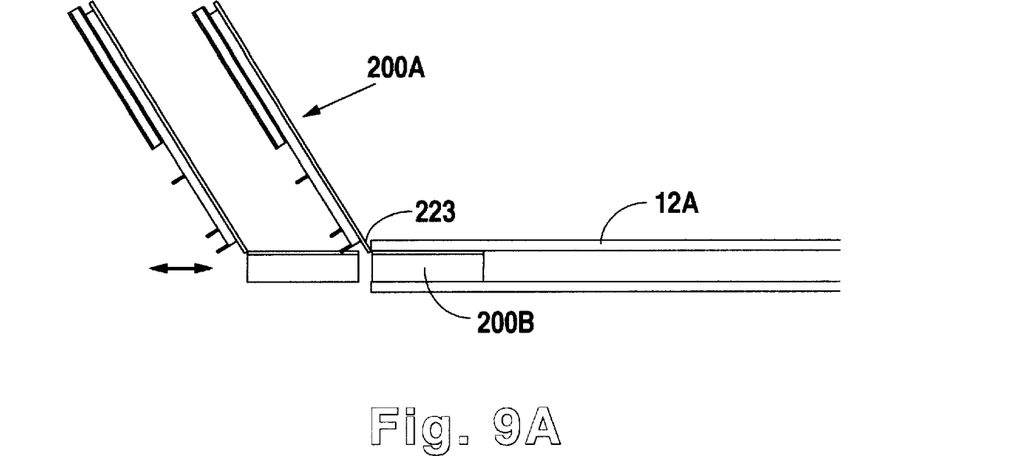
FIGS. 9A–9C illustrate the steps needed to install or remove the pocket door of the present invention when utilizing the unique support panel with bulkhead-mounted runners.
Figure 9B:
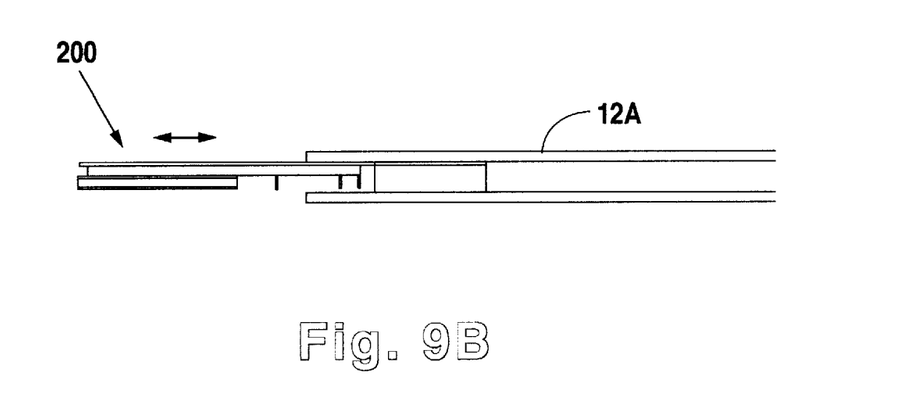
Figure 9C:
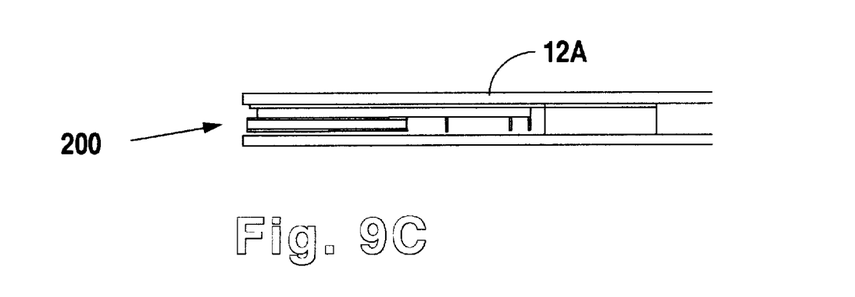

FIGS. 9A–9C illustrate the installation of the pocket door assembly using the runners of the alternate preferred embodiment. FIG. 9A–9B show the installation with the support panel with the door segment thereon sliding between the bulkhead and decorative panel. FIG. 9C illustrates the installation or removal of the entire assembly from the door by first removing the decorative trim, rotating the door segment at a hinge 223 between the door support portion 200B and motor support portion 200B so it clears the opposite door jam after having removed the fasteners holding the support panel to the bulk head. If a motor is not used, then there is no motor mount support portion 200B. The entire assembly slides out.

It is noted with reference to the specification that runners may include discontinuous members such as a multiplicity of "L" or "Z" shaped brackets.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. An aircraft pocket door including an aircraft bulkhead and a decorative panel, the pocket door having a first door segment, first mounting means for mounting the door segment, the first mounting means for allowing the door segment to move between an open and a closed position, the pocket door comprising:

a first support panel for mounting the first mounting means thereto with the first door segment engageable therewith, the first support panel having a top edge and a bottom edge and a leading edge;

a multiplicity of first runners for fastening to the bulkhead for guiding the first support panel at the top and bottom edges thereof adjacent the bulkhead; and, first fastener means for attaching the first support panel to the bulkhead adjacent the inboard edge of the bulkhead;

wherein installation of the first support panel is accomplished by guiding the first support panel over the runners and fastening the first support panel against the bulkhead.

2. The invention of claim 1 wherein the multiplicity of first runners includes a pair of runners, one for engaging the top edge of the support panel and one for engaging the bottom edge of the support panel.

3. The invention of claim 1 wherein the multiplicity of first runners includes two runners and wherein the two runners are parallel.

4. The invention of claim 1 wherein the multiplicity of first runners includes two runners which are are non-parallel.

5. The invention of claim 1 wherein the runners of the first multiplicity of runners are "L"-shaped.

6. The invention of claim 1 wherein the runners of the first multiplicity of runners are "Z"-shaped.

7. The invention of claim 1 further including a decorative trim strip attachable to the inboard leading edge of the bulkhead.

8. The invention of claim 7 further including a decorative trim strip attachable to the inboard leading edge of the bulkhead.

9. The aircraft pocket door of claim 1 with a second door segment, second mounting means for allowing the second door segment to move between an open and closed position, the aircraft pocket door of claim 1 further including: a second support panel for mounting the second mounting means thereto with the second door segment engageable therewith, the second support panel having a top edge and bottom edge and a leading edge;

a multiplicity of second runners for slideably engaging the second support panel at the top and bottom edge thereof adjacent the bulkhead and second fastener means for attaching the second support panel to the bulkhead adjacent the inboard edge of the bulkhead;

wherein installation of the second support panel is accomplished by sliding the second support panel over the second runners and fastening the second support panel to the bulkhead.

10. The invention of claim 9 wherein the multiplicity of second runners includes a pair of runners, one for engaging the top edge of the support panel and one for engaging the bottom edge of the support panel.

11. The invention of claim 9 wherein the multiplicity of second runners includes two runners and wherein the two runners are parallel.

12. The invention of claim 9 wherein the multiplicity of second runners includes two runners which are are non-parallel.

13. The invention of claim 9 wherein the runners of the second multiplicity of runners are "L"-shaped and made of plastic.

14. The invention of claim 9 wherein the runners of the second multiplicity of runners are "Z"-shaped and made of plastic.

15. A pocket door for attaching to the interior of an aircraft, the aircraft having a bulkhead, the pocket door comprising:
- a first support panel shaped to lay flush against the bulkhead, having a leading and trailing edge;
- a first door segment for mounting parallel to the first support panel;
- means for slideably mounting the first door segment to the first support panel; and
- fastening means accessible from outside the bulkhead for fastening the first support panel to the bulkhead.

16. The pocket door of claim 15 further comprising:
- a second support panel shaped to lay flush against the bulkhead, having a leading and trailing edge;
- a second door segment for mounting parallel to the second support panel;
- means for slideably mounting the second door segment to the second support panel; and
- fastening means accessible from outside the bulkhead for fastening the first support panel to the bulkhead.

* * * * *